US007366122B2

(12) United States Patent
Lee et al.

(10) Patent No.: US 7,366,122 B2
(45) Date of Patent: Apr. 29, 2008

(54) APPARATUS AND METHOD FOR PROCESSING DATA IN HIGH SPEED DOWNLINK PACKET ACCESS (HSDPA) COMMUNICATION SYSTEM

(75) Inventors: Kang-Gyu Lee, Yongin-si (KR); Sung-Wook Park, Yongin-si (KR); Sang-Hoon Chae, Suwon-si (KR); Jin-Young Oh, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 365 days.

(21) Appl. No.: 11/006,072

(22) Filed: Dec. 7, 2004

(65) Prior Publication Data

US 2005/0135329 A1    Jun. 23, 2005

(30) Foreign Application Priority Data

Dec. 22, 2003    (KR) ...................... 10-2003-0094553

(51) Int. Cl.
*H04B 7/00* (2006.01)
(52) U.S. Cl. .................................. 370/310.1; 370/310.2
(58) Field of Classification Search ................ 370/349, 370/310.1, 310.2, 395.1, 395.2, 395.61
See application file for complete search history.

(56) References Cited

U.S. PATENT DOCUMENTS

| 7,079,539 B2* | 7/2006 | Calle et al. .................. 370/392 |
| 2002/0093964 A1* | 7/2002 | Yik et al. ..................... 370/400 |
| 2002/0154612 A1 | 10/2002 | Massie et al. |
| 2003/0007480 A1 | 1/2003 | Kim et al. |
| 2004/0028020 A1 | 2/2004 | Frederiksen et al. |
| 2004/0114593 A1* | 6/2004 | Dick et al. ................... 370/389 |

FOREIGN PATENT DOCUMENTS

| WO | WO 02/100029 | 12/2002 |
| WO | WO 03/087978 | 10/2003 |

* cited by examiner

*Primary Examiner*—Matthew Anderson
*Assistant Examiner*—Angelica M. Perez
(74) *Attorney, Agent, or Firm*—The Farrell Law Firm, PC

(57) ABSTRACT

Disclosed is a process for processing an MAC-hs PDU (Protocol Data Unit) in an HSDPA (High Speed Downlink Packet Access) communication system, transmitting at least one PDU (Protocol Data Unit) received over a physical (PHY) layer to an MAC (Media Access Control) layer in an HSDPA (High Speed Downlink Packet Access) communication system, includes an HS-DSCH (High Speed-Downlink Shared Channel) decoder for decoding the PDU at intervals of a first period during which the PDU is received from the PHY layer, and storing the decoded PDU in a first memory; a second memory for storing a control table containing position and number information of the PDU, and performing a reordering queue operation on the basis of the position and number information of the PDU; an HSDPA (High Speed Downlink Packet Access) controller for reading the PDU from the first memory, storing the read PDU in the second memory, monitoring the second memory during a second period which is longer than the first period, updating the number of PDUs stored in the second memory, and transmitting an interrupt signal to a reordering queue distributor at intervals of the second period; and a reordering queue distributor for reading the position and number information of the PDU from the control table upon receiving the interrupt signal from the HSDPA controller, and transmitting the PDU stored in the second memory to an upper layer.

7 Claims, 6 Drawing Sheets

APPARATUS AND METHOD FOR PROCESSING DATA IN HIGH SPEED DOWNLINK PACKET ACCESS (HSDPA) COMMUNICATION SYSTEM

PRIORITY

This application claims priority to an application entitled "APPARATUS AND METHOD FOR PROCESSING DATA IN HIGH SPEED DOWNLINK PACKET ACCESS (HSDPA) COMMUNICATION SYSTEM", filed in the Korean Intellectual Property Office on Dec. 22, 2003 and assigned Serial No. 2003-94553, the contents of which are hereby incorporated by reference.

BACKGROUND OF THE INVENTION

1. Field of the Invention

The present invention relates to a communication system using an HSDPA (High Speed Downlink Packet Access) scheme, and more particularly to an apparatus and method for processing an MAC-hs (Medium Access Control-high speed) PDU (Protocol Data Unit) in an HSDPA (High Speed Downlink Packet Access) communication system.

2. Description of the Related Art

Generally, an HSDPA (High Speed Downlink Packet Access) scheme has developed into an HS-DSCH (High Speed-Downlink Shared Channel) for supporting downlink high-speed packet transmission in a W-CDMA communication system, its associated control channels, and devices, systems, and methods for the HS-DSCH. An HARQ (Hybrid Automatic Retransmission Request) scheme has been proposed to support the HSDPA scheme. A detailed configuration and an HARQ scheme for use in the W-CDMA communication system will hereinafter be described with reference to FIG. 1.

FIG. 1 is a block diagram illustrating a conventional W-CDMA communication system. Referring to FIG. 1, the W-CDMA communication system includes a Core Network (CN) 100, a plurality of RNSs (Radio Network Subsystems) 110 and 120, and a UE (User Equipment) 130. The first RNS 110 and the second RNS 120 each includes an RNC (Radio Network Controller) and a plurality of Node Bs. It should be noted that each RNS will hereinafter be referred to as an RNC, and the plurality of Node Bs will be referred to as a cell for the convenience of description. For example, the RNS 110 includes an RNC 111 and a plurality of Node Bs 113 and 115. The RNC is classified into a Serving RNC (SRNC), a Drift RNC (DRNC), and a Controlling RNC (CRNC) according to its various purposes. Particularly, the RNC is classified into the SRNC and the DRNC according to the functions associated with individual UEs. A specific RNC capable of managing the UE's information and transmitting data to the core network is an SRNC of the UE. If the UE's data is transmitted to the SRNC over another RNC instead of the SRNC, the RNC is a DRNC of the UE. The CRNC indicates an RNC for controlling individual Node Bs. For example, if the RNC 111 manages information of the UE 130 as shown in FIG. 1, the RNC 111 is an SRNC. If the UE 130 moves to another position and thus the UE 130's data is transmitted or received using the RNC 112, the RNC 112 is a DRNC. The RNC 111 for controlling the Node B 113 is a CRNC of the Node B 113.

The HARQ scheme, particularly, an n-channel SAW-HARQ (n-channel Stop And Wait Hybrid Automatic Retransmission Request) scheme will hereinafter be described. The conventional ARQ (Automatic Retransmission Request) scheme enables an ACK (Acknowledgement) signal and retransmission packet data to be interchanged between a UE and an RNC (Radio Network Controller). The HARQ scheme generally uses an FEC (Forward Error Correction) method to increase the transmission efficiency of the ARQ scheme. The HSDPA scheme enables the ACK signal and the retransmission packet data to be interchanged between the UE and an MAC HS-DSCH of the RNC. The HSDPA scheme uses N logical channels, and thereby uses the n-channel SAW HARQ method capable of transmitting a plurality of packet data elements even though there is no ACK signal. The SAW ARQ (Stop And Wait Retransmission Request) scheme only transmits the next packet data after receiving the ACK signal associated with previous packet data, resulting in deterioration of channel use efficiency. The n-channel SAW HARQ scheme successively transmits a plurality of packet data units to a destination over a different channel since there is no ACK signal associated with the previous packet data, resulting in an increased channel use efficiency. In more detail, provided that N channels are established between the UE and the Node B, and individual N channels can be distinguished from each other using a specific time or a specific channel number, the UE receiving the packet data can recognize which of the channels is adapted to transmit packet data received at a predetermined time, may reconstruct a plurality of packet data units in the order of data receptions or may combine corresponding packet data units in the order that they were received to perform necessary operations.

Operations of the n-channel SAW HARQ scheme will hereinafter be described with reference to FIG. 1. Firstly, the n-channel SAW HARQ scheme, particularly, the 4-channel SAW HARQ scheme, is performed between the UE 130 and the Node B 113. It is assumed that each channel of the four channels is assigned a logical ID (Identifier). A Medium Access Control (MAC) layer between the UE 130 and the Node B 113 includes HARQ processors corresponding to individual channels. The Node B 113 assigns a channel ID "1" to a coding unit used for the initial data transmission, and transmits the channel ID "1" to the UE 130. In this case, the channel ID is clearly assigned to the coding unit. If an error occurs in the coding unit due to the channel ID "1", the UE 130 transmits an NACK (Negative Acknowledgement) signal associated with the coding block to the HARQ processor (i.e. HARQ processor 1) corresponding to the channel ID "1" via the Node B 113. In this case, the Node B can transmit subsequent coding blocks over a prescribed channel 2 without taking into consideration the ACK arrival information associated with a coding block of the channel 1. Upon receiving the NACK signal of the channel 1's coding block from the UE 130, the Node B 113 re-transmits a corresponding coding block over the channel 1. Therefore, the UE 130 recognizes that the coding block having been transmitted over the channel 1 is retransmitted using the channel ID of the re-transmitted coding block, and transmits the retransmission coding block to the HARQ processor 1. The HARQ processor 1 receiving the retransmission coding block combines the prestored initial transmission coding block with the retransmission coding block. The n-channel SAW HARQ scheme connects the channel ID to the HARQ processor on a one to one basis, and can properly match the initial transmission data with the retransmission data without delaying the user data transmission execution time by having to wait for the ACK signal.

The hierarchical structure of the W-CDMA system using the HSDPA scheme further requests an HARQ function from the MAC layer, such that a new hierarchical structure corresponding to the requested HARQ function changes from the typical hierarchical structure, i.e. a W-CDMA communication system which does not use the HSDPA scheme. In order to support the HSDPA scheme, the MAC-hs entity is further implemented in individual MAC-c/sh (Medium Access Control-common/shared) and MAC-d (Medium Access Control-common/redrafted) entities in the MAC layer structure for use in the conventional W-CDMA communication system.

FIG. 2 is a diagram illustrating an MAC-hs layer configuration of a UE for use in a CDMA communication system using the HSDPA scheme. Referring to FIG. 2, the MAC-hs sub-layer 115 adapts an HARQ function for use in the HS-DSCH capable of supporting an HSDPA scheme as a basic function. The MAC-hs sub-layer 115 transmits the ACK signal to the Node B when there is no error associated with a data block (i.e. packet data) received from a radio channel. If there is an error associated with the data block received from the radio channel, the MAC-hs sub-layer 115 generates an NACK signal for requesting the retransmission of the, and transmits the NACK signal to the Node B. The MAC-hs sub-layer 115 receives predetermined setup information from the RRC.

The data block transmitted to the MAC-hs sub-layer 115 over the HS-DSCH is stored in one of many HARQ processers contained in the HARQ block. In this case, an HARQ process ID contained in a downlink control signal indicates which of the HARQ processers will store the data block. The HARQ processer having stored the data block transmits NACK information to the UTRAN when an unexpected error occurs in the data block, thus requesting the retransmission of the data block from the UTRAN. If there is no error in the data block, the HARQ processer transmits the data block to a reordering block, and transmits a ACK information to the UTRAN. There is a plurality of reordering blocks for each priority level, which is similar to a transmission buffer of the UTRAN. The HARQ process transmits the data block to a corresponding reordering block through a PCI (Priority Class Identifier) contained in the data block. The most important characteristic of the reordering block is that the reordering block can support a sequential transmission of data. The data block is sequentially transmitted to an upper layer on the basis of a TSN (Transmission Sequence Number). If previous data blocks of the corresponding data block are not received, the corresponding data block is first stored in a buffer, and is then transmitted to the upper layer on the condition that all of the previous data blocks have been received. Typically, the reordering block non-sequentially receives the data blocks because a plurality of HARQ processes are operated at the same time. The reordering buffer is required to sequentially transmit the data blocks to the upper layer. Data blocks of certain TSNs are maintained in the reordering buffer, and at least one data block corresponding to a TSN which is less than the TSNs of the data blocks maintained in the reordering buffer is omitted, such that a stall phenomenon occurs when the data blocks cannot be transmitted to the upper layer.

In the case where there is no CRC error in the MAC-hs PDU that indicates an output signal of an HSDPA MAC-hs decoding chain configured in the form of a hardware device, a corresponding MAC-hs PDU is transmitted to the upper layer MAC layer at predetermined time intervals equal to an integer multiple of the HS-DSCH TTI (2 ms). Based on the 3GPP ($3^{rd}$ Generation Partnership Project) Release 5 TS 25.306 specification, the higher the HS-PDSCH category level, the shorter the transmission interval. The MAC-hs PDU received at the predetermined time intervals denoted by "Inter-minimum TTI interval (=N)×HS-DSCH TTI (2 ms)" is transmitted to the upper MAC layer on the basis of a new definition called "Inter-minimum TTI interval". The upper layer (MAC) must read output data of the HSDPA MAC-hs layer at the predetermined time intervals denoted by "N×HS-DSCH TTI", for example, at intervals of 2 ms. Provided that the hardware does not carry out the buffering operation, the MAC layer typically operating in a controller must unavoidably read the MAC-hs PDU value at maximum intervals of 2 ms. However, it may be difficult for a typical OS (Operating System) widely used for the UE to perform an interrupt handling operation adapted to execute a predetermined data processing function at intervals of 2 ms.

SUMMARY OF THE INVENTION

An improved apparatus and method for transmitting the MAC PDU received in the upper layer using a specific primitive referred to as a PHY-HS-DATA-IND defined between the PHY and the MAC layers capable of providing an HSDPA service in a conventional 3GPP system must be defined in the standard communication specifications.

Therefore, the present invention has been made in view of at least the above problems, and it is an object of the present invention to provide an apparatus and method for providing a more effective memory interface based on a release timer to prevent a stall phenomenon of an N-channel SAW protocol from being generated in an HSDPA communication system.

In accordance with one aspect of the present invention, the above and other objects can be achieved by an apparatus for transmitting at least one PDU (Protocol Data Unit) received over a physical (PHY) layer to an MAC (Media Access Control) layer in an HSDPA (High Speed Downlink Packet Access) communication system, including an HS-DSCH (High Speed-Downlink Shared Channel) decoder for decoding the PDU at intervals of a first period during which the PDU is received from the PHY layer, and storing the decoded PDU in a first memory; a second memory for containing a control table containing a position and an information number of the PDU, and performing a reordering Queue operation on the basis of the position and number information of the PDU; an HSDPA (High Speed Downlink Packet Access) controller for reading the PDU from the first memory, storing the read PDU in the second memory, monitoring the second memory during a second period that is longer than the first period, updating the number of PDUs stored in the second memory, and transmitting an interrupt signal to a reordering queue distributor at intervals of the second period; and a reordering queue distributor for determining the position and the information number of the PDU from the control table contained in the second memory upon receiving the interrupt signal from the HSDPA controller, and transmitting the PDU stored in the second memory to an upper layer.

In accordance with another aspect of the present invention, there is provided a method for transmitting at least one PDU (Protocol Data Unit) received over a physical (PHY) layer to an MAC (Media Access Control) layer in an HSDPA (High Speed Downlink Packet Access) communication system, including the steps of performing a reording queue operation in a second memory for storing a control table containing a position and an information number of the PDU, on the basis of the position and the information number of the PDU; decoding the PDU at intervals of a first period during which the PDU is received from the PHY layer, and storing the decoded PDU in a first memory; reading the PDU from the first memory, storing the read PDU in the second memory, monitoring the second memory during a second period longer than the first period, updating the information number of PDUs stored in the second memory, and transmitting an interrupt signal to a reordering queue distributor at intervals of the second period; and updating the position and the information number of the PDU in the control table according to the interrupt signal, and transmitting the PDU stored in the second memory to an upper layer.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
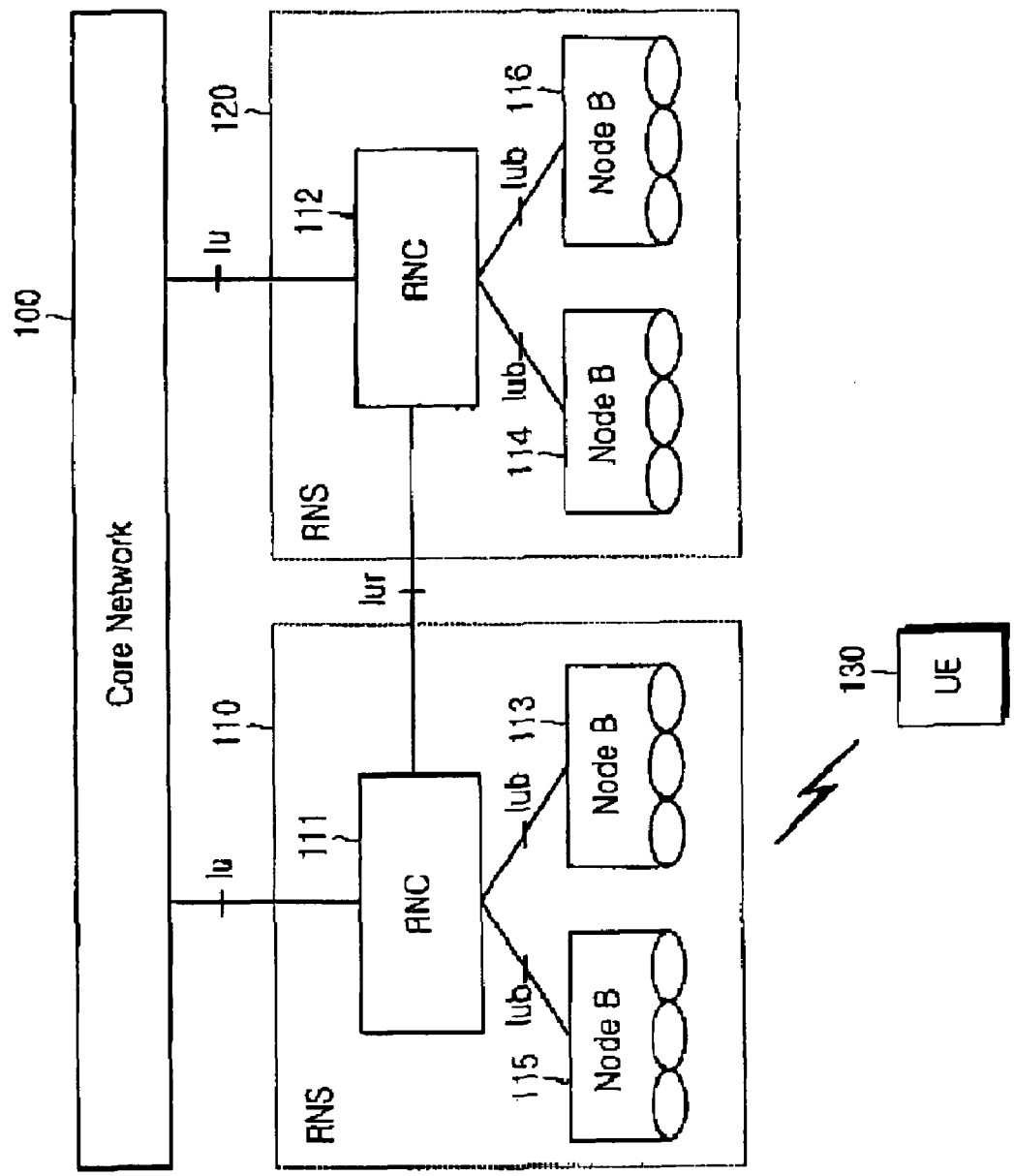
FIG. 1 is a block diagram illustrating a conventional UMTS communication system.
Figure 2:
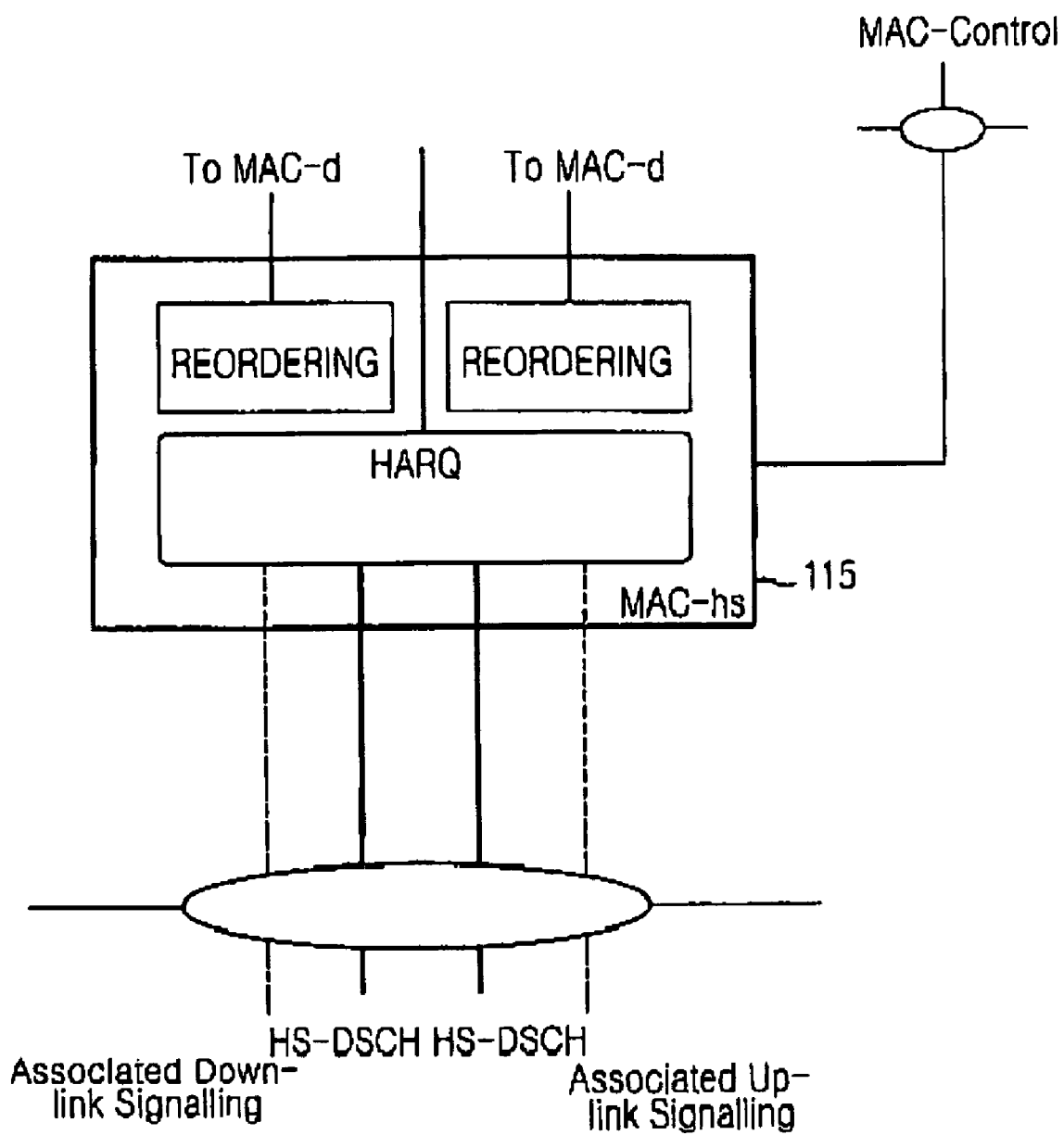
FIG. 2 is a diagram illustrating an MAC-hs layer configuration of a UE for use in a CDMA communication system using the HSDPA scheme.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may obscure the subject matter of the present invention.

Provided that an HSDPA MAC-hs decoding chain is configured in the form of a hardware device and can perform a buffering operation during a predetermined period of time, an MAC layer acting as an upper layer need not read an MAC-hs PDU at the maximum intervals of 2 ms. The conventional art has difficulty in performing such a buffering operation by increasing the space of an internal or first memory in its own hardware block, due to the increase in the required number of gates, and therefore, this implementation method is generally undesirable. The present invention includes an external or second memory to buffer the MAC-hs PDUs and does not perform an internal buffering operation, such that there is no need to increase the number of gates. Due to the use of the external memory, a considerably large-sized memory may be adapted to the present invention to store the MAC-hs PDUs therein. The MAC layer processes the MAC-hs PDUs received at intervals of 10 ms at the same time, instead of processing such MAC-hs PDUs at intervals of 2 ms, resulting in reduction of unnecessary loads caused by frequent interrupt operations.

Figure 3:
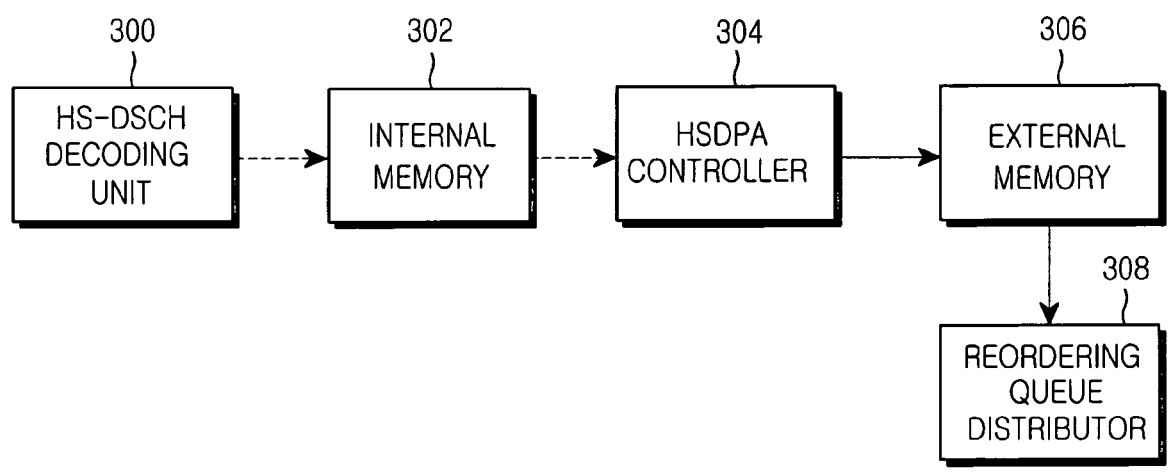
FIG. 3 is a block diagram illustrating a device for processing a PDU (Protocol Data Unit) in accordance with a preferred embodiment of the present invention.

A memory interface for more effectively processing high-speed data using an HSDPA communication system will hereinafter be described with reference to FIG. 3. FIG. 3 is a block diagram illustrating a device for processing a PDU (Protocol Data Unit) in accordance with a preferred embodiment of the present invention.

Referring to FIG. 3, the PDU includes an HS-DSCH decoding unit 300, an internal memory 302, an HSDPA control block 304, an external memory 306, and a reordering queue Distribution block 308. Although the preferred embodiments describes an internal and an external memory, the present invention is not limited to memories that are physically internal and external to the PDU itself. Prior to describing the present invention, it is assumed that an Inter-minimum TTI interval is determined to be a specific value of 1 as denoted by "Inter-minimum TTI interval=1" in the present invention, and it is also assumed that there is no CRC error in a received MAC-hs PDU, i.e. a maximum data reception operation is performed, although these may be present in the implemented system.

The HS-DSCH decoding unit 330 outputs the MAC-hs PDU to the internal memory 302 at intervals of 2 ms. The HSDPA controller 304 reads the MAC-hs PDU from the internal memory 302 where the data is written at intervals of 2 ms, and copies the read MAC-hs PDU in the external memory 306. The information of an initially-copied index from a plurality of copied indexes and the number of MAC-hs PDUs received during a predetermined time of 10 ms are updated. The HSDPA controller 304 informs the reordering queue distributor 308 of the presence of the MAC-hs PDU sets to be processed by the external memory 306 (e.g., a maximum of 5 MAC-hs PDU sets) at intervals of 10 ms. The external memory 306 includes 512 entries each having a predetermined size (e.g., a maximum MAC-hs PDU size). Also, the external memory 306 further includes a control table that contains a position and an information number of the initial MAC-hs PDU copied in the external memory 306 during the most recent time of 10 ms. Upon receiving an information message from the HSDPA controller 304 at intervals of 10 ms, the reordering queue distributor 308 updates information of a reordering control table which is used to perform a reordering queue operation on the basis of the MAC-hs PDU position and information number contained in the control table of the external memory 306. In this case, the maximum number of reordering control tables is set to 8. The MAC-hs PDU copied in the external memory 306 is processed within a predetermined time of 1024 ms (=64×8×2), is transmitted to an upper layer higher than an RLC.

Figure 4:
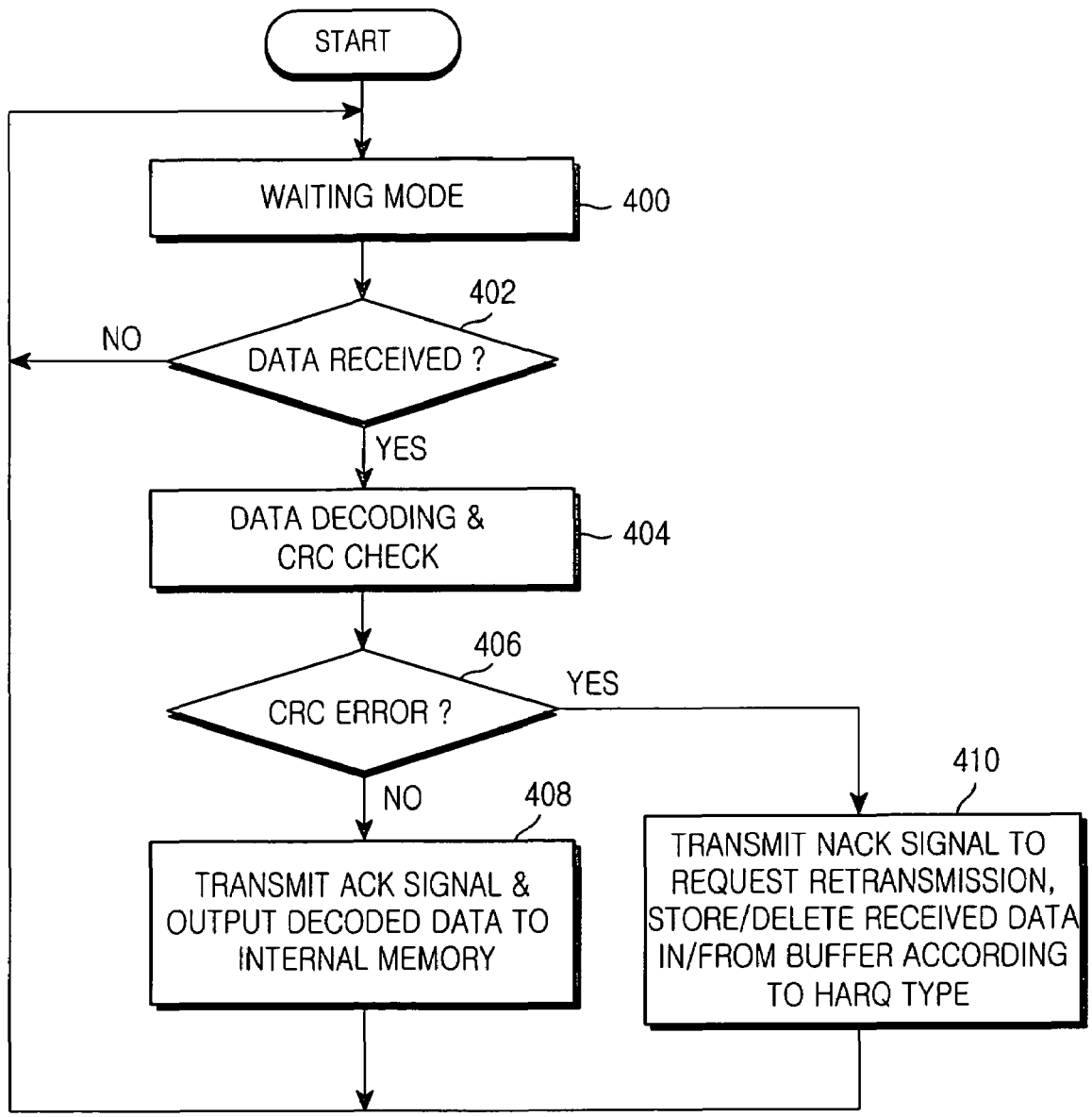
FIG. 4 is a flow chart illustrating a method for processing the PDU using an HS-DSCH decoder in accordance with a preferred embodiment of the present invention.

Individual methods for processing data using the HS-DSCH decoding unit 300, the HSDPA control block 304, and the reordering queue distributor 308 shown in FIG. 3 will hereinafter be described with reference to FIGS. 4 to 6.

A method for processing data using the HS-DSCH decoding unit 300 will hereinafter be described with reference to FIG. 4. FIG. 4 is a flow chart illustrating a method for processing the PDU using the HS-DSCH decoder 300 in accordance with a preferred embodiment of the present invention.

The HS-DSCH decoding unit 300 remains in a waiting mode at step 400, and determines if data is received over an HS-PDSCH at step 402. If it is determined that data has been received over the HS-PDSCH at step 402, the HS-DSCH decoding unit decodes the data at step 404, and checks a CRC at step 406.

If it is determined that there is no CRC error at step 406, the HS-DSCH decoding unit 300 determines that a normal data reception is performed at step 408, and transmits an ACK signal to a counterpart, and outputs the decoded data to the internal memory 302. If it is determined that the CRC error has been found at step 406, the HS-DSCH decoding unit 300 transmits an NACK signal to the counterpart to request a retransmission from the counterpart, and stores the received data in the external memory 306 or deletes the same data from the external memory 306 according to HARQ type information.

Figure 5:
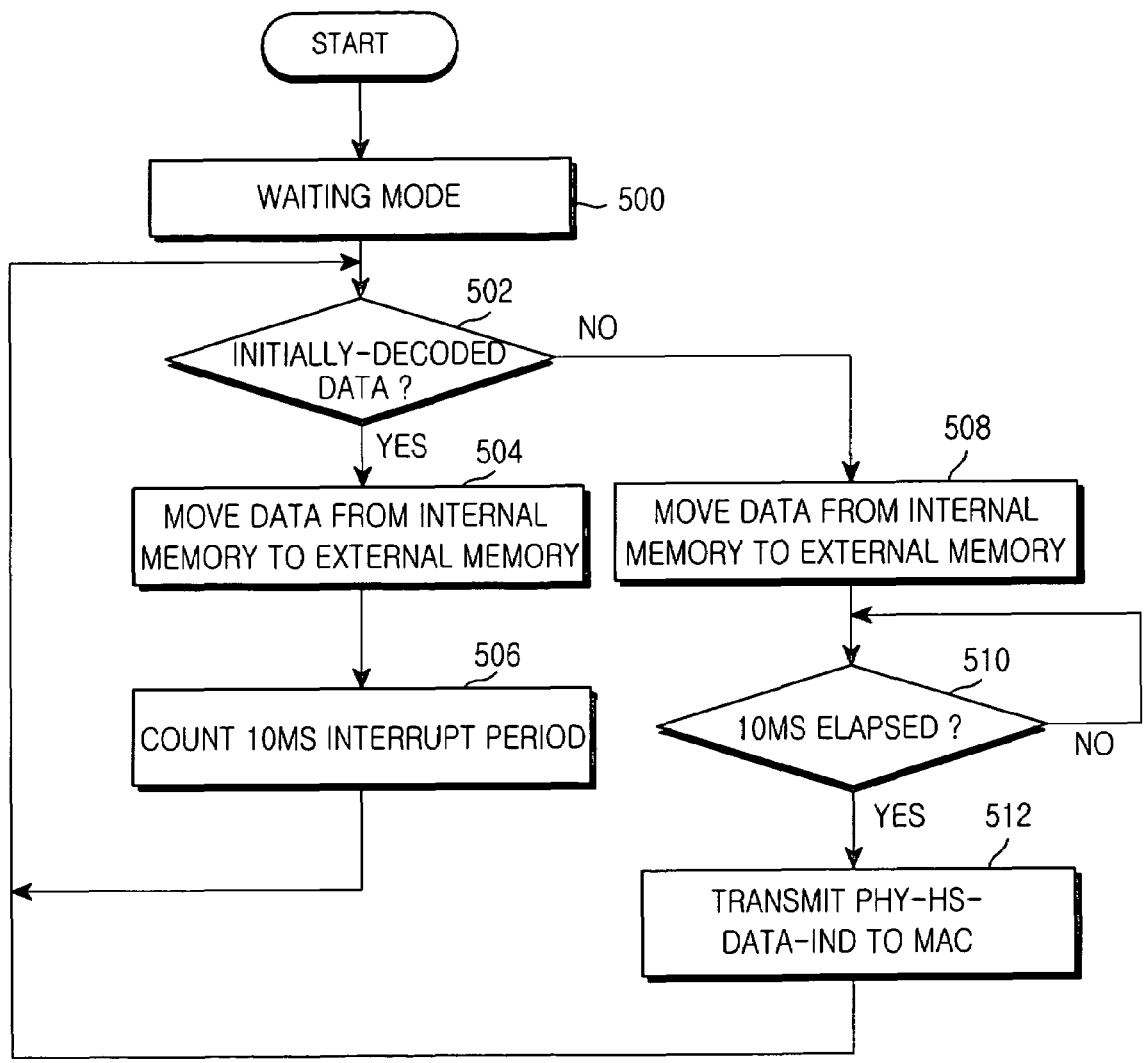
FIG. 5 is a flow chart illustrating a method for processing the PDU using an HSDPA controller in accordance with a preferred embodiment of the present invention.

FIG. 5 is a flow chart illustrating a method for processing the PDU using the HSDPA controller 304 in accordance with a preferred embodiment of the present invention. Referring to FIG. 5, the HSDPA controller 304 remains in a waiting mode at step 500, and determines if initially-decoded data is present at step 502. If it determined that the initially-decoded data is present at step 502, the HSDPA controller 304 moves the decoded data stored in the internal memory 302 to the external memory 306 at step 504. The HSDPA controller 304 performs interrupt count operations at intervals of 10 ms. If it is determined that the initially-decoded data is not present at step 502, the HSDPA controller 304 moves the decoded data stored in the internal memory 302 to the external memory 306 at step 508. The HSDPA controller 304 determines if 10 ms elapses at step 510. If it is determined that 10 ms has elapsed at step 510, the HSDPA controller 304 sends the reordering queue distributor 306 contained in the MAC layer a message denoted by "PHY-HS-DATA-IND" at step 512. In other words, the HSDPA controller 304 moves the decoded data stored in the internal memory 302 to the external memory 306, such that it can prevent the internal memory updated at a maximum intervals of 2 ms from being overwritten. If the initially-decoded data is present at step 502, the HSDPA controller 304 performs interrupt operations at intervals of 10 ms. The HSDPA controller 304 transmits the message "PHY-HS-DATA-IND" to the reordering queue distributor 308 of the MAC layer at intervals of 10 ms.

Figure 6:
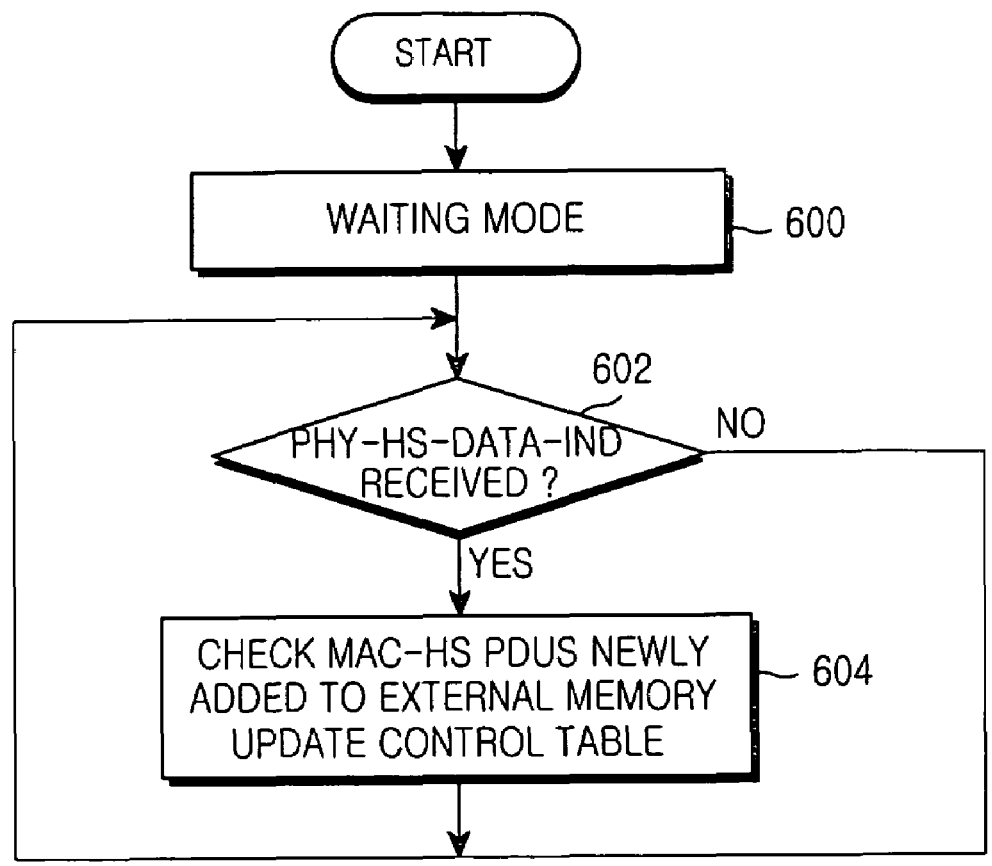
FIG. 6 is a flow chart illustrating a method for processing the PDU using a reordering Queue distributor in accordance with a preferred embodiment of the present invention.

FIG. 6 is a flow chart illustrating a method for processing the PDU using the reordering queue distributor 308 in accordance with a preferred embodiment of the present invention.

Referring to FIG. 6, upon receiving the message "PHY-HS-DATA-IND" form the HSDPA controller 304, the reordering queue distributor processes a plurality of MAC-hs PDUs newly stored in the external memory 306 during the most recent 10 ms, and updates the reordering control table to perform a maximum of 8 reordering queue functions.

As stated above, the present invention uses the external or second memory to buffer reception MAC-hs PDUs, such that it can enable the MAC layer acting as an upper layer to process the MAC-hs PDUs at intervals of 10 ms.

As apparent from the above description, the present invention does not perform a hardware buffering operation because it adapts the external memory to buffer a plurality of reception MAC-hs PDUs, such that it can prevent the number of gates from being increased. Due to the use of external memory, the present invention can adapt a considerably large-sized memory capable of storing the MAC-hs PDUs. The HSDPA controller copies the received MAC-hs PDUs to the external memory, such that it can perform commands of other layers operated by a CPU (Central Processing Unit) at the same time. Further, the MAC layer simultaneously processes the MAC-hs PDUs received at intervals of 10 ms, instead of having to process the MAC-hs PDUs at intervals of 2 ms. An implementation of the present invention resulting in a reduction of unnecessary loads caused by frequent interrupt operations. Furthermore, the individual MAC-hs PDUs buffered by the external memory perform the reordering operations due to a reordering control table process result, and are used in the MAC and RLC layers in common, resulting in reduction of the number of unnecessary copy-attach operations between the MAC and RLC layers.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for transmitting at least one PDU (Protocol Data Unit) received over a physical (PHY) layer to an MAC (Media Access Control) layer in an HSDPA (High Speed Downlink Packet Access) communication system, comprising:

an HS-DSCH (High Speed Downlink Shared Channel) decoder for decoding the PDU at intervals of a first period during which the PDU is received from the PHY layer, and storing the decoded PDU in a first memory;

a second memory for storing at least one of control tables containing position and number information of the PDU, and performing a reordering queue operation on the basis of the position and number information of the PDU;

an HSDPA (High Speed Downlink Packet Access) controller for reading the PDU from the first memory, storing the read PDU in the second memory, monitoring the second memory during a second period longer than the first period, updating the number of PDUs stored in the second memory, and transmitting an interrupt signal to a reordering queue distributor at intervals of the second period;

a reordering queue distributor for reading the position and number information of the PDU from the control table upon receiving the interrupt signal from the HSDPA controller, and transmitting the PDU stored in the second memory to an upper layer wherein the HSDPA controller transmits primitive information for informing the reordering queue distributor of the upper layer of the arrival of the second period, if the second period arrives while transmitting the decoded PDU stored in the first memory to the second memory; and wherein the reordering queue distributor receives the primitive information from the HSDPA controller, determines which PDUs are newly-added to the second memory during the most recent second period, and updates the at least one of control tables to perform a reordering queue function.

2. The apparatus as set forth in claim 1, wherein the second period is one of 10 ms and an integer multiple of the 10 ms.

3. The apparatus as set forth in claim 1, wherein the HSDPA controller, if an initially-decoded PDU is present, moves the decoded PDU stored in the first memory to the second memory.

4. A method for transmitting at least one PDU (Protocol Data Unit) received over a physical (PHY) layer to an MAC (Media Access Control) layer in an HSDPA (High Speed Downlink Packet Access) communication system, comprising the steps of:

a) performing a reordering queue operation in a second memory for storing at least one of control tables containing position and number information of the PDU, of the reordering queue operation based on the position and number information of the PDU;

b) decoding the PDU at intervals of a first period during which the PDU is received from the PHY layer, and storing the decoded PDU in a first memory;

c) reading the PDU from the first memory, storing the read PDU in the second memory, monitoring the second memory during a second period longer than the first period, updating the number of PDUs stored in the second memory, and transmitting an interrupt signal to a reordering queue distributor at intervals of the second period;

d) updating the position and number information of the PDU in the at least one of control tables according to the interrupt signal, and transmitting the PDU stored in the second memory to an upper layer e) transmitting primitive information for informing the upper layer of a second period arrival, if the second period is established while transmitting the PDU stored in the first memory to the second memory; and c1) upon receipt of primitive information, determining which PDUs are newly-added to the second memory during the most recent second period, and updating the at least one of control tables to perform a reordering queue function.

5. The method as set forth in claim 4, wherein the second period is one of 10 ms and an integer multiple of 10 ms.

6. The method as set forth in claim 4, wherein step (b) includes the step of:

b1) if an initially-decoded PDU is present, moving the PDU stored in the first memory to the second memory, and timing the second period.

7. The method as set forth in claim 4, wherein primitive information is denoted by a PHY-HS-DATA-IND.

* * * * *